May 14, 1963     L. F. HIGGINS, JR     3,089,279
ANIMATED DEVICES
Filed Nov. 6, 1959
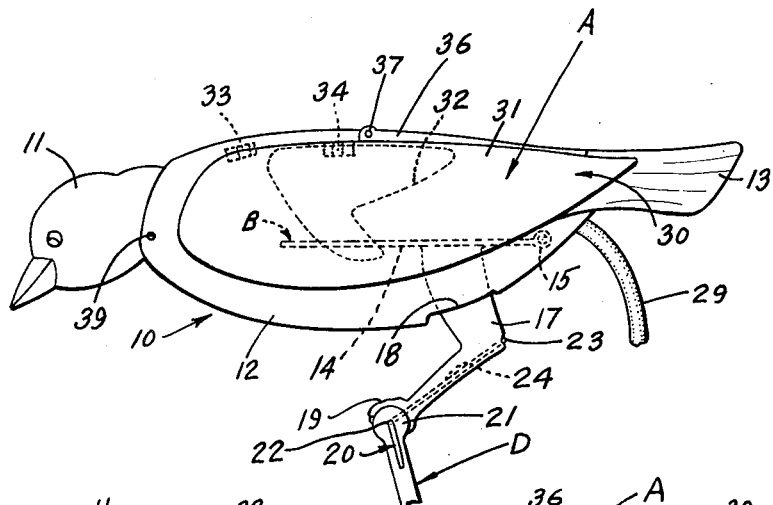
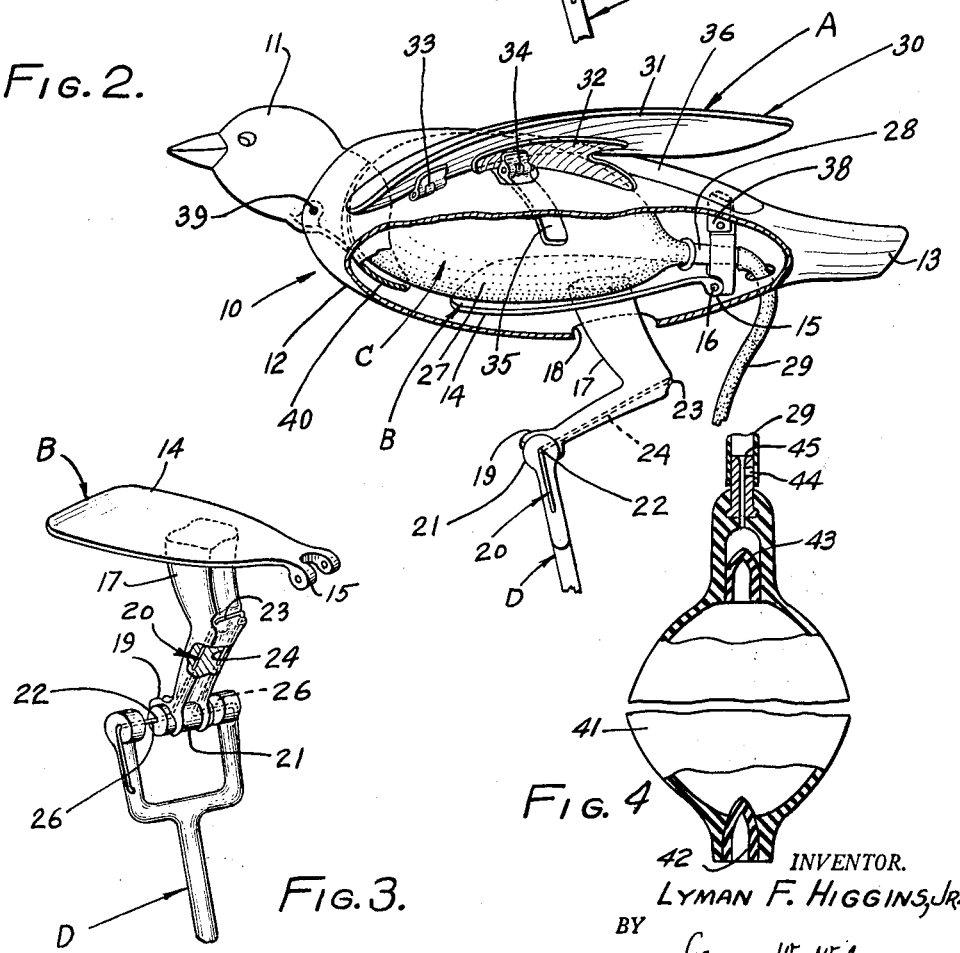
INVENTOR.
LYMAN F. HIGGINS, JR.
BY George W. Wilson.
ATTORNEY 3,089,279
ANIMATED DEVICES
Lyman F. Higgins, Jr., Hawthorne, Calif.
(10424 Evelyn Drive, R.F.D. 3, Clio, Mich.)
Filed Nov. 6, 1959, Ser. No. 851,381
2 Claims. (Cl. 46—124)

My invention relates to the field of animated devices of the type operated by mechanism within the device and activated for instance, though not necessarily by air placed under pressure by a pump, pressure bulb and the like connected to said mechanism.

The invention particularly relates to improvements in devices of the type described in my co-pending patent application Serial No. 621,334, filed November 9, 1956, and now Patent No. 2,918,752, and has for its general object to provide a greater variety of movements of devices of the type disclosed.

A wide variety of animated toys, advertising devices and the like have been proposed or are known in the art, most of those capable of a number of different movements being expensive to produce and maintain, while those costing less to produce have generally a relatively short life.

It is an object of my invention to provide animated devices devised so that they may be made to execute a plurality of movements, which in the case of toys representing animals such as birds, provide amusing, novel, and lifelike effects, the devices being inexpensive to produce and maintain.

The invention is illustrated by way of example in the form of animated representations of birds but it is to be understood is not restricted thereto.

Further objects and features of my invention will appear from the specification following and accompanying illustrative drawings.

In the drawings:

FIGURE 1 is a side elevational view of a bird seated on a perch in a downwardly inclined position.

FIGURE 2 is a side elevation of the bird shown in FIGURE 1 with part of the side of the body cut away to show interior parts, the bird being tipped slightly about its axis to show operating mechanism and the position of the parts being that taken during the tilting back of the bird from the position shown in FIGURE 1.

FIGURE 3 is a fragmentary view in perspective, drawn on a larger scale, showing a torsion spring arrangement limiting the tilting movement of the bird in downward or upward direction on its perch.

FIGURE 4 is a section through a pressure bulb fitted with two check valves drawn on a larger scale, for operating the device of FIGURE 2.

Referring now to FIGURE 2, the device is shown as in the form of a bird 10 formed as a hollow upper and lower molding of thermosetting plastic suitably connected together as for instance by adhesive, and is light in weight. Wing structure A is pivotally connected to the body. Body supporting means B are pivotally mounted within the hollow body 10 and may be operated by means C comprising a balloon inflated by air pressure through a tube and resilient bulb or other air compressing means.

The body 10 is permanently but movably mounted on a novel forked perch D adapted to be held in the operator's hand.

Describing first the body 10, FIGURES 1 and 2 show a head 11, a body 12 and tail 13.

The supporting means B comprise a plate 14 pivoted at 15 on a pin 16 held at its ends in the sides of the body 10 toward the tail portion 13.

A leg portion 17, which may be molded with the plate 14 projects downwardly through a slot 18 in the body of the bird and the claws 19 appear to grasp a wire 20 supported at its ends in a forked perch D, but the claws 19 actually are molded with the cylindrical short member 21, FIGURE 3, which is slotted at 22 at each end inwardly to its axis.

The wire 20 constitutes a torsion spring formed of a length of wire provided with a U-shaped loop 23 at its midpoint. The straight portions 24 of the wire are passed downwardly through slanting holes in the lower part of the leg portion 17 and opening into the slots 22, the wires are then bent outwardly as indicated at 26 and the ends of the outwardly bent portions 26 are secured in the ends of the forked perch D in any suitable manner.

The forward rotation of the bird about the perch is thus restrained by the resistance of the torsion spring to the weight of the bird acting downwardly forward of the perch, and the backward motion of the bird is similarly limited. It will be understood that the perch might be mounted on a board instead of being held in the hand to give the appearance of the bird in its downward position shown in FIGURE 1 being in the act of picking up food.

The operating means C comprises a balloon 27 positioned on the plate 14 with its mouth mounted on the nozzle of a connector element 28 secured in the body and to which a length 29 of rubber tube is connected. Air under pressure may be supplied through tube 29 to the balloon 27 by any suitable means such as a small bellows or hand held bulb (not shown).

As shown in FIGURE 2 the balloon 27 when inflated engages with the interior surface of the bird's body above the plate 14 and because the body is light in weight, pivots it about the pin 16. When the air is forced into the balloon sharply the upward rotational movement continues until the momentum of the body is checked by the resistance of the torsion spring. The air is released from the balloon by relaxing pressure on the bulb or bellows (FIG. 5) and the body of the bird will rotate downwardly about pin 16 until its weight is again supported by the torsion spring.

Preferably the body of the bird is fitted with wing structure A so arranged as to be extended by the inflation of the balloon and returned to closed position by gravity.

As best shown in FIGURE 2 each wing 30 comprises a main member 31 and a small extension member 32. Each main wing 31 is mounted by hinge 33 at the shoulders of the body and each extension wing member 32 is mounted by hinges 34 positioned rearwardly of hinges 33. The extension wing member underlies the main wing member 31 and is formed with an angular downwardly projecting arm 35 integral with the lugs of the hinge and spaced from the inside of the body when the wings are closed. When the balloon is inflated it will press against arms 35 thus raising the small extension member 32 by rotating it about its hinge pin and thereby raising the main wing member 31.

An access door 36 is preferably provided to enable the balloon 27 to be replaced if necessary and to facilitate assembly. While the door 36 may be mounted in various ways, it is preferred to provide a small separate molded plate hinged at 37, FIGURE 1, at its wider forward end on the centerline of the top of the body to the forward portion thereof, and at its narrow rearward end having ears 38 drilled with holes aligned with holes through the connector element and the sides of the body. The access door is secured in closed position by a pin (not shown) inserted through the holes in the sides of the body, ears 38 and the connector element 28.

The head 11 is pivoted in the shoulder portion of the body on a pin 39 and provided with a plate 40 extending into position to be engaged by the balloon 27 when inflated to raise the head from the position shown in FIG- URE 1 to that shown in FIGURE 2. The bill of the bird is preferably weighted to ensure the rapid downward movement of the head when air pressure is released. The device may be operated by the usual type of pressure bulb 41 shown in FIGURE 4 which is furnished with molded in place check valves 42, 43 effective to deliver an unidirectional flow of air to the device, release of pressure air from the balloon 27 being effected by uncovering a hole 44 formed through the outlet nozzle 45 and tube 29 secured thereon.

While the described construction provides a lifelike representation of a bird feeding on the ground, raising its head and fluttering its wings if disturbed, a simpler construction having a fixed head portion and wings merely pivoted to the body will provide a toy attractive to young children. Obviously also somewhat more complicated models having a pivoted head and tail connected by arms to the plate 14 may be readily devised and might be more intersting to older children.

It is to be noted that while the devices specifically described are shown as fanciful birds, any number of other forms may be constructed embodying the essential novel features of my invention and also while means for operating the devices by air pressurized by a pressure bulb and effecting inflation of one or more balloons or bladders arranged within the devices has been described, other air pressurizing devices may of course be utilized such as pumps, bellows or a source of compressed air, the air operating any suitable means such as bellows.

The embodiments of my invention herein described and shown in the accompanying illustrative drawings have been given by way of example only and not as limitative of my invention since various changes may be made therein by those skilled in the art without departing from the scope thereof as defined by the appended claims.

I claim:
1. An animated device having a hollow body and parts movably mounted thereon and extensible means therein operated by means effective to force air into said extensible means and manipulated by the user;

a plate within and pivoted at one end to the body;

said extensible means comprising a balloon positioned on said plate in position when distended to engage with the body and said parts mounted movably thereon;

and a stationary mounting member on which the body is permanently but movably mounted by means of a part rigidly secured to said plate and projecting through an opening in said body and connected to the stationary mounting member by torsion spring means for oscillatory movement of the body about said stationary member.

2. An animated device as set forth in claim 1 and in which the means manipulated by the user to force air into the extensible means comprise:

a pressure bulb having inlet and outlet valves;

a tube connecting the outlet valve and the balloon, said valves being effective to deliver an unidirectional flow of air through the tube to the balloon as the pressure bulb is repetitiously squeezed by the user, said tube being provided with an opening through the wall thereof adapted to be closed by the user when building up pressure in the balloon and to be opened when the user desires to release pressure air from the balloon.

References Cited in the file of this patent
UNITED STATES PATENTS

| | | |
|---|---|---|
| 1,859,268 | Larson | May 17, 1932 |
| 2,570,584 | Miskin et al. | Oct. 9, 1951 |